United States Patent
Beld et al.

(10) Patent No.: US 8,731,902 B2
(45) Date of Patent: May 20, 2014

(54) SYSTEMS AND METHODS FOR ACCESSING APPLICATIONS BASED ON USER INTENT MODELING

(75) Inventors: Beth Beld, San Francisco, CA (US); Joerg Beringer, Los Altos, CA (US); Frederic Samson, San Francisco, CA (US); Marge Breya, Menlo Park, CA (US); Prasad Bhamidipati, Santa Clara, CA (US); Murray Spork, San Francisco, CA (US)

(73) Assignee: SAP AG, Walldorf (DE)

( * ) Notice: Subject to any disclaimer, the term of this patent is extended or adjusted under 35 U.S.C. 154(b) by 735 days.

(21) Appl. No.: 12/977,646

(22) Filed: Dec. 23, 2010

(65) Prior Publication Data
US 2012/0166177 A1   Jun. 28, 2012

(51) Int. Cl.
*G06F 17/27* (2006.01)
(52) U.S. Cl.
USPC .......................................................... 704/9
(58) Field of Classification Search
USPC .......................................................... 704/9
See application file for complete search history.

(56) References Cited

U.S. PATENT DOCUMENTS

| | | | | |
|---|---|---|---|---|
| 6,138,098 | A * | 10/2000 | Shieber et al. | 704/257 |
| 7,149,983 | B1 * | 12/2006 | Robertson et al. | 715/810 |
| 2005/0004973 | A1 * | 1/2005 | Snover et al. | 709/200 |
| 2005/0273771 | A1 * | 12/2005 | Chang et al. | 717/136 |
| 2005/0289522 | A1 * | 12/2005 | Chang et al. | 717/140 |
| 2007/0118514 | A1 * | 5/2007 | Mariappan | 707/3 |
| 2009/0132667 | A1 | 5/2009 | Jung et al. | |
| 2011/0065082 | A1 * | 3/2011 | Gal et al. | 434/365 |

* cited by examiner

*Primary Examiner* — Michael N Opsasnick
(74) *Attorney, Agent, or Firm* — Fountainhead Law Group PC

(57) ABSTRACT

In one embodiment, the present invention includes a computer-implemented method comprising storing information in a datastore, the information corresponding to a plurality of computer applications, wherein the plurality of computer applications have associated annotations, receiving an input from a user, providing a first verb and a first noun corresponding to a user intent based on said input, and specifying one or more of said plurality of applications based on the verb and noun annotations for the plurality of applications and the first verb and first noun corresponding to the user intent. The annotations comprise a verb describing one or more activities performed by an associated application and a noun describing work objects on which the activities are performed. Users access the applications in the datastore.

20 Claims, 7 Drawing Sheets

SYSTEMS AND METHODS FOR ACCESSING APPLICATIONS BASED ON USER INTENT MODELING

BACKGROUND

The present invention relates to computing, and in particular, to a systems and methods for accessing applications based on user intent.

Unless otherwise indicated herein, the approaches described in this section are not prior art to the claims in this application and are not admitted to be prior art by inclusion in this section.

Computer applications have become ubiquitous in the work and private lives of users. Computer applications running on computer systems from servers to personal computers to personal digital assistants and cell phones permeate our lives. Typically, users load different computer software applications onto their computing devices based on their own personal needs and preferences. For example, a user of a work computer may use an Enterprise Resource Planning ("ERP") software application, a communications and calendaring software application (e.g., Microsoft® Outlook®), and other work specific applications, whereas a home user may use a photo or video editing software application and other applications targeting hobbies and entertainment.

As computers and computer applications have become more prevalent, the line between business and personal use has become more blurred while the number of overlapping and competing applications continues to grow. Computer users may be interchanging between a work context and home context while working from home, for example, and may further have particular computing requirements that are more readily satisfied by one particular application over another depending on the use context. Accordingly, it may be desirable for computer applications to become more portable and readily accessible across different contexts. Additionally, it is an on-going challenge for particular applications to meet the particular needs of the user in a given context, and it would be desirable to understand the rapidly changing needs of each user in real time and allow users to access a wide variety of different applications more targeted to the job at hand.

While service-discovery and a loose-coupling of software components has occurred, the navigation and the expressiveness of user interfaces of business applications is still limited to navigating between landing pages (e.g., role-based) and packaged UI (ERP transactions or office applications). Currently, the information architecture of traditional computer software systems is described by navigational links between pre-packaged software and screens, and the system has limited or no understanding of the user intent and purpose of services. A conversation with the user and the system on how to achieve a goal is currently limited to proprietary and local applications (e.g. problem resolution wizards, map directions, domain-specific tools such as trip booking). But at the application level, such knowledge is currently not represented efficiently, and thus cannot support the user in choosing between multiple methods and services for accomplishing one action. For example ToDos in office products describe the task (due date, owner, status) but do not recommend the enactment itself (implementation of the action to accomplish the task).

Existing approaches to understanding user needs are typically limited to monitoring invocation of services (e.g., a user did or did not start Outlook®). However, current implementations are lacking the separation of user intent from the method or action to accomplish the intent. Consequently, today's application frameworks cannot have a conversation with the user about the appropriateness of a software product with respect to a user's intent, or alternatives with equivalent or superior functionality. The system cannot help users to become aware of available on-demand services in context of their needs or desires.

The present disclosure addresses these and other issues with systems and methods for accessing applications based on user intent modeling.

SUMMARY

Embodiments of the present invention include systems and methods for accessing applications. In one embodiment, the present invention includes a computer-implemented method comprising storing information in a datastore, the information corresponding to a plurality of computer applications, wherein the plurality of computer applications have associated annotations, the annotations comprising a verb describing one or more activities performed by an associated application and a noun describing work objects on which the activities are performed, and wherein users access the applications in the datastore, receiving an input from a user, providing a first verb and a first noun corresponding to a user intent based on said input, and specifying one or more of said plurality of applications based on the verb and noun annotations for the plurality of applications and the first verb and first noun corresponding to the user intent.

In one embodiment, specifying is based on directly matching the first verb and first noun with the verb and noun annotations for the one or more specified applications.

In one embodiment, specifying is based on semantically matching the first verb and first noun with the verb and noun annotations for the one or more specified applications.

In one embodiment, the verb and noun annotations are included in a semantic space.

In one embodiment, the verb and noun annotations are machine executable semantic representations in the semantic space.

In one embodiment, the annotations associated with the plurality of applications further include context information, said providing step including providing first context information corresponding to the user intent based on said input, and wherein the specifying step is further based on context information annotations and said first context information.

In one embodiment, the user input specifies the first verb and first noun directly.

In one embodiment, the user input selects a first application and the first verb and first noun are annotations associated with the first application.

In one embodiment, the method further comprises a pre-stored language comprising verbs and nouns, wherein the verb and noun annotations and the first verb and first noun are in said language.

In one embodiment, the method further comprises generating a recommendation based on the verb and noun annotations for the plurality of applications and the first verb and first noun corresponding to the user intent.

In one embodiment, the method further comprises monitoring annotations from a plurality of applications accessed by the user and generating recommendations based on the monitored annotations.

In one embodiment, the input from the user is received in a first application, the first application having a plurality of functions having associated verb and noun annotations, and wherein the input from the user invokes one or more of said functions and the method further comprises specifying one or more of said plurality of applications based on the verb and noun annotations for the plurality of applications and the verb and noun annotations associated with said invoked function.

In one embodiment, the functions are user accessible.

In one embodiment, the functions are hierarchical within the first application.

In one embodiment, the method further comprises storing activities for a user and determining whether or not an activity is routine or non-routine, wherein if an activity is routine, the method further comprises automatically invoking a routine application corresponding to said activity, and if the activity is not routine, the method further comprises recommending a non-routine application corresponding to said activity.

In another embodiment, the present invention includes a non-transitory computer readable storage medium embodying a computer program for performing a method for performing the techniques described herein. For example, the computer program may perform a method comprising storing information in a datastore, the information corresponding to a plurality of computer applications, wherein the plurality of computer applications have associated annotations, the annotations comprising a verb describing one or more activities performed by an associated application and a noun describing work objects on which the activities are performed, receiving an input from a user, providing a first verb and a first noun corresponding to a user intent based on said input, and specifying one or more of said plurality of applications based on the verb and noun annotations for the plurality of applications and the first verb and first noun corresponding to the user intent.

In one embodiment, the non-transitory computer readable storage medium includes a method where specifying is based on directly matching the first verb and first noun with the verb and noun annotations for the one or more specified applications.

In one embodiment, the non-transitory computer readable storage medium includes a method where specifying is based on semantically matching the first verb and first noun with the verb and noun annotations for the one or more specified applications.

In another embodiment, the present invention includes a computer system comprising one or more processors, a software program, executable on said computer system. The software program may include executable code. When executed, the software program is configured to perform the techniques described herein. For example, the program may store information in a datastore, the information corresponding to a plurality of computer applications, wherein the plurality of computer applications have associated annotations, the annotations comprising a verb describing one or more activities performed by an associated application and a noun describing work objects on which the activities are performed, receive an input from a user, provide a first verb and a first noun corresponding to a user intent based on said input, and specify one or more of said plurality of applications based on the verb and noun annotations for the plurality of applications and the first verb and first noun corresponding to the user intent.

The following detailed description and accompanying drawings provide a better understanding of the nature and advantages of the present invention.

DETAILED DESCRIPTION

Described herein are techniques for accessing applications. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention include techniques for accessing computer software applications (services) based on user intent modeling. One particular aspect of the issue may be understood by way of example. If a traveler wants to commute from home to the airport, it is straight forward to decide between different methods (own car, public transportation, taxi, limo, shuttle, . . . ). The user is choosing between such services based on prior knowledge about such options or airport information. In on-demand software, such associations do not exist. There is no efficient mechanism for promoting such classifications into the system environment of a user to do in-context promotion depending on user context (e.g., promotion in the context of actual use at use time).

Figure 1:
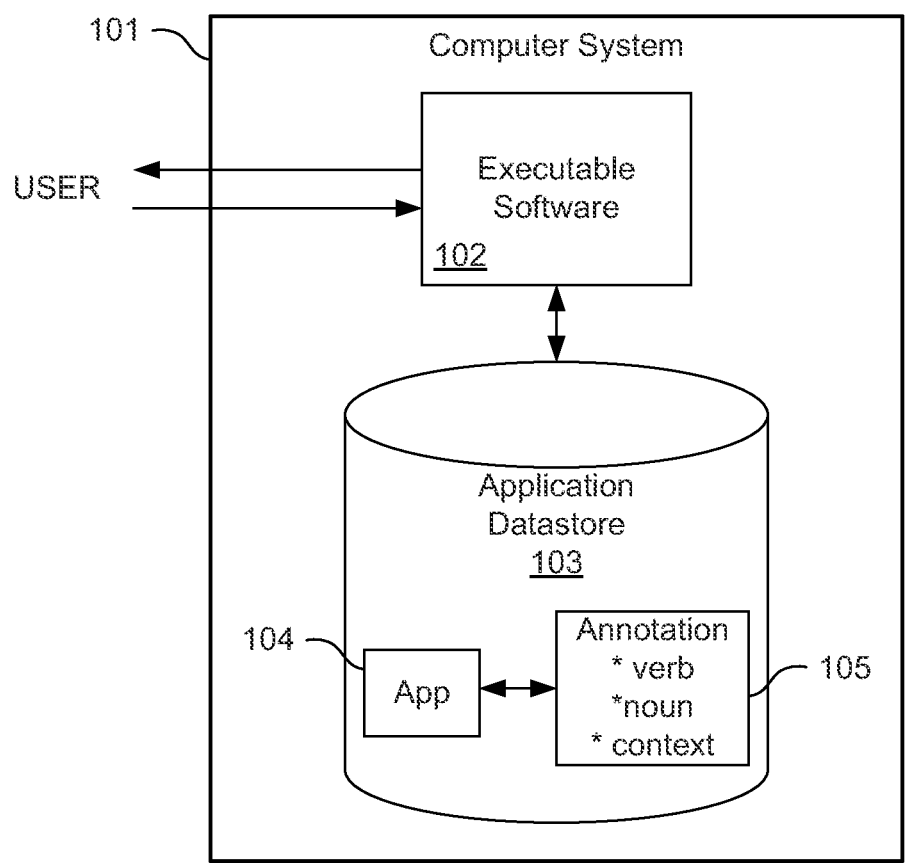
FIG. 1 shows a computer system for accessing applications based on user intent modeling according to one embodiment.

FIG. 1 shows a computer system for accessing applications based on user intent modeling according to one embodiment. Computer system 101 may include one computer or multiple computers with different software components operating on different computers. The computers may be portable computing systems (e.g., cell phones or personal digital assistants), tablet computers, laptop computers, desktop computers, or server computers, for example. Computer system 101 includes executable software 102 that performs the processes described herein. Executable software 102 may interface with a user by receiving user inputs (e.g., from a mouse, keyboard, or touch screen) and sending outputs (e.g., to a display). Embodiments of the present invention include storing information in a datastore 103 that supports access to computer applications by software 102. Datastore 103 may be referred to as an "Appstore", for example. It is to be understood that datastore 103 may store the applications themselves or information for accessing the applications, such as a link, for example. The datastore is said to store information corresponding to a plurality of computer applications to cover different equivalent implementation choices.

FIG. 1 illustrates an application 104 in datastore 103. Embodiments of the present invention include applications having associated annotations that support application access by expressing user intent. Application 104 has associated annotation 105. Annotation 105 includes one or more verbs-noun pairs. Annotation 105 may further have context information ("context"). Applications in datastore 103 may be annotated with verbs and nouns that express the user's intent (e.g., when the user invokes the application). For example, if an application is a travel application, the verb may be "Book" and the noun may be "Trip" (e.g., "Book Trip"). In this example, the verb and noun express an intent of the user to "book a trip" when a user invokes the application. A financial application may have an annotation with a verb "Forecast" and a noun "Budget" (e.g., Forecast Budget), which expresses a user's intent to "forecast a budget", for example. The verb component of the annotation describes one or more activities performed by an associated application, and the noun component of the annotation describes what is referred to herein as the work objects on which the activities are performed. For instance, referring to the examples above the nouns "Trip" and "Budget" are work objects. The present embodiment is advantageous because annotations are used to express intent rather than merely the invocation of the program itself, for example.

In this document, unless expressly narrowed otherwise, the term "application" is used in a broad context and synonymous with a software tool. A tool (or verb tool) is a piece of software that, when executing on a computer, performs useful actions on behalf of the user (e.g., an information worker). An application (tool) may be instantiated through the mechanism of the user expressing a verb to the system. Verb tools are executed in order to accomplish some business goal. As described in more detail below applications are able to fully leverage the capabilities of the presently disclosed software, including suggesting and instantiating additional tools the information worker may need, for example. Tools may help information workers find and make sense of the information and events relevant to them, automate complex tasks on their behalf, support collaboration with other information workers, and record the decisions and actions they take.

Applications typically have a visualization and UI that is meaningful for the user. Some applications may be invoked via an API by software 102, for example, which may parse the information worker intent (e.g. 'analyze sales'). This may include injecting content into the application and configuring the application based on context, user preferences, and best practices. Some applications may use the APIs for context awareness and data consumption, for example. Applications may be capable of sending queries to, and retrieving data sets from, an information base (or Mesh). Additionally, an application may takes advantage of other foundation capabilities of certain embodiments of software 102; including context awareness. An application may also leverage horizontal utilities, shared services, and core applications of particular implementations of software 102. Additionally, an application may consume events from particular embodiments of software 102 and can additionally be a source of events back to software 102, for example. In some embodiments, applications may operate on rules, where rules are one kind of input into the operation of a tool.

In one embodiment, when a user accesses executable software 102, the user may enter an input that is received by the software. In one embodiment, the user may enter an input that expresses an intent in the form of a verb and noun directly. For example, when the user first opens software 102, and before any applications are accessed, the user may enter "Book Trip" (e.g., into a text input box of a user interface). The verb and the noun express the user's intent and may be provided to software 102 from the user directly. Alternatively, intent may be inferred when a user invokes a particular application with verb and noun annotations. For instance, when a user selects an application, and the selected application has associated verb and noun annotations, then the associated verb and noun annotations (e.g., Book Trip or Forecast Budget) are provided to software 102 to express the user's intent.

The verb and noun corresponding to the user's intent may be used to specify one or more applications in datastore 103. For example, in the case where a user provides a verb and noun directly expressing intent to software 102, the verb and noun provided may be used to specify one or more of the applications in datastore 103 based on the verb and noun annotations for the applications. Using the examples above, if a user enters "Book Trip", then the input verb and noun may be matched, for example, with the verb and noun annotations associated with a particular application to specify the application (e.g., present it in a list of options for a user to select). Alternatively, if the user expresses their intent by invoking one application with associated verb and noun annotations, then software 102 may specify another application with matching, for example, associated annotations. For instance, if the user invokes one application with verb and noun annotations "Book Trip," then software 102 may find another application by matching, for example, verb and noun annotations "Book Trip" for the two applications. The second application may be specified for selection by the user (e.g., as an alternative tool for performing the task). The process is illustrated further in FIG. 2.

Figure 2:
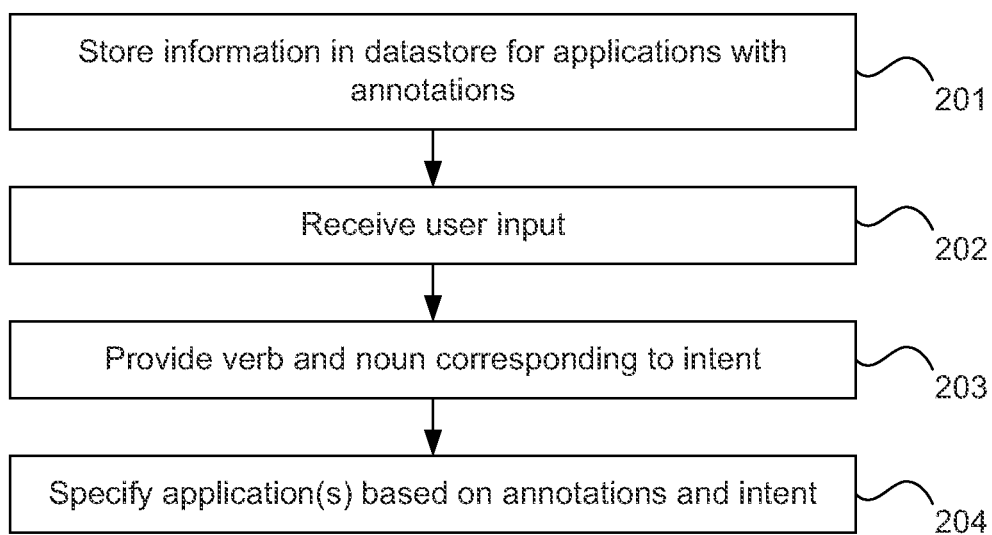
FIG. 2 shows a method for accessing applications based on user intent modeling according to one embodiment.

FIG. 2 shows a method for accessing applications based on user intent modeling according to one embodiment. At 201, information is stored in a datastore for applications with annotations. The information may be the applications and annotations themselves, or information for accessing the applications and annotations, for example. At 202, an input is received from a user. In one embodiment, the user may provide a natural language input expressing intent by entering a verb and a noun (e.g., "Book Trip") or the user may invoke one of the applications. At 203, a first verb and a first noun corresponding to a user intent is provided based on the user input. If a text input is provided, then the verb and noun in the natural language input are provided to software 102. Natural language input techniques may also be employed for determining user intent, for example. If a user invokes one of the applications, then a verb and a noun associated with the invoked application are provided to software 102. At 204, one or more of the applications in the datastore is specified based on the verb and noun annotations associated with such applications and the first verb and first noun corresponding to the user intent (e.g., provided directly through a natural language input or indirectly through invocation of another application). As mentioned above, embodiments of the present invention may include annotations that further include context information. If context information is available, some embodiments may include the context information as part of the providing and specifying steps above. For instance, the providing step includes providing first context information corresponding to the user intent based on the user input, and the specifying step is further based on context information annotations and the first context information from the user input.

In one embodiment, the verbs and nouns annotated to a particular application may be from a language (e.g., a Language of Business). The language may be redefined and/or prestored, for example. Accordingly, embodiments may annotate each application within the application store with one or more nouns/verbs from the language of business so that the software can have a dialog with the user and understand a user's intent and take actions based on the intent, such as starting or recommending applications, for example. An application may be annotated with verbs and nouns describing a wide range of uses for the application to guide the system in determining and/or linking user intent with applications that fulfill the goals of the user as expressed by the intent. In one embodiment, the verb and noun annotations are included in a semantic space. In a semantic space, words are represented by multiple attributes and related based on the attributes (e.g., in an N-dimensional space). A semantic space may include terms and concepts capable of being compared and/or measured by proximity and affinity of content so the system can try to find the best, closest matching point within a semantic space—sometimes not even picking only one term—for a match. In a semantic space, a semantic match may be based on specified match criteria, for example, and may return multiple matches. As the software receives the user's expressions of intent (e.g., explicit or implicit), the software may match verbs and nouns directly or perform a semantic match. Accordingly, the specifying step described above may be based on semantically matching the first verb and first noun with the verb and noun annotations for the one or more specified applications. As mentioned previously, semantic matching may be based on specified matching criteria in the semantic space (e.g., proximity, etc. ... ) rather than a direct textual match, for example. Accordingly, in one embodiment, the verbs and nouns used as annotations may be machine executable semantic representations in the semantic space. The software may receive the verbs and nouns and the computer may execute algorithms using these inputs to determine what applications may be activated, recommended, or otherwise specified to the user. The following table illustrates example of semantic relations:

| Semantic Relation | Example | Transitive | Symmetric |
|---|---|---|---|
| similarity | produce::create | Y | Y |
| strength | wound::kill | Y | N |
| antonymy | open::close | N | Y |
| enablement | fight::win | N | N |
| happens-before | buy::own; marry::divorce | Y | N |

Figure 3:
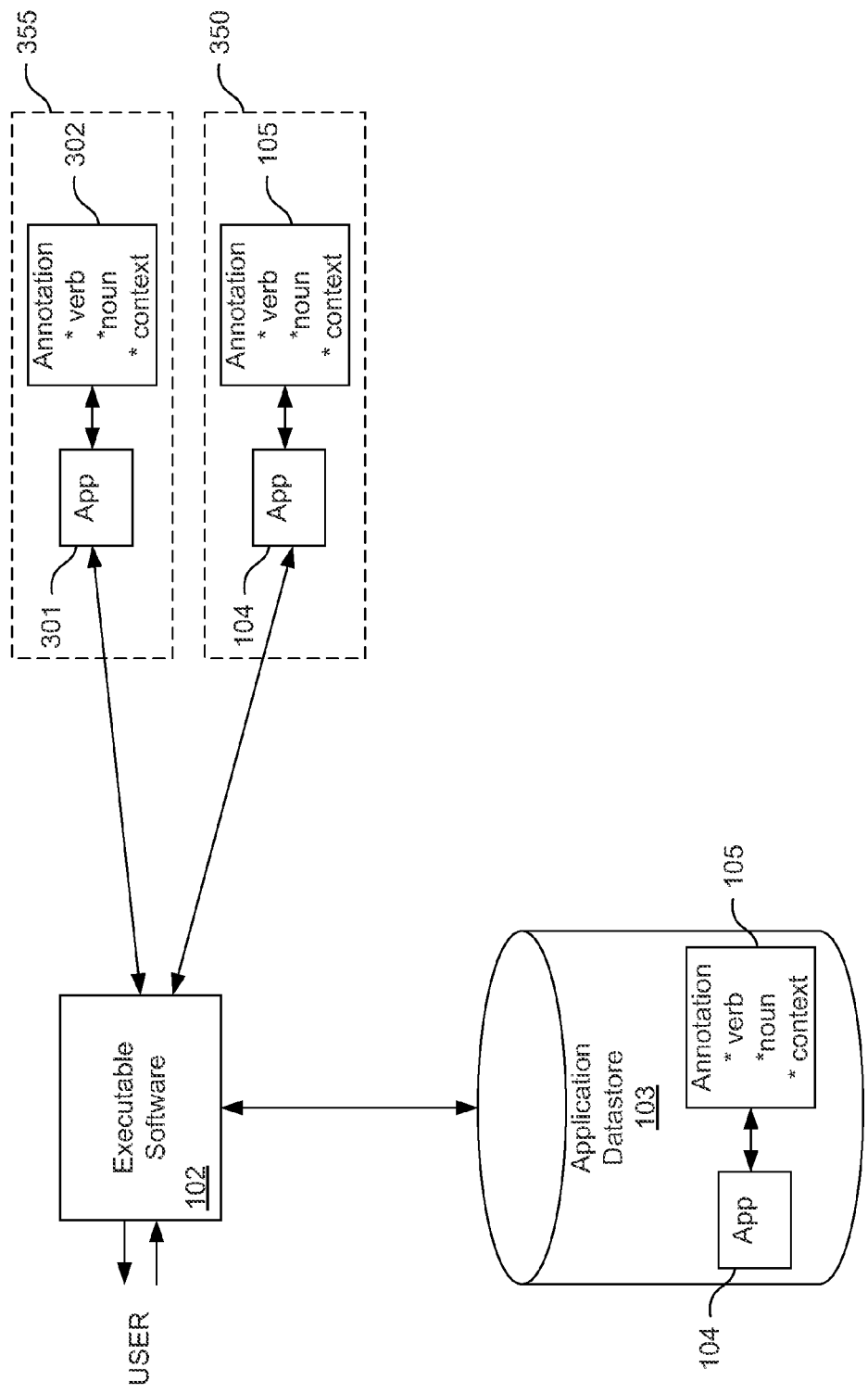
FIGS. 3-4 shows an example of accessing applications based on user intent modeling according to one embodiment.
Figure 4:
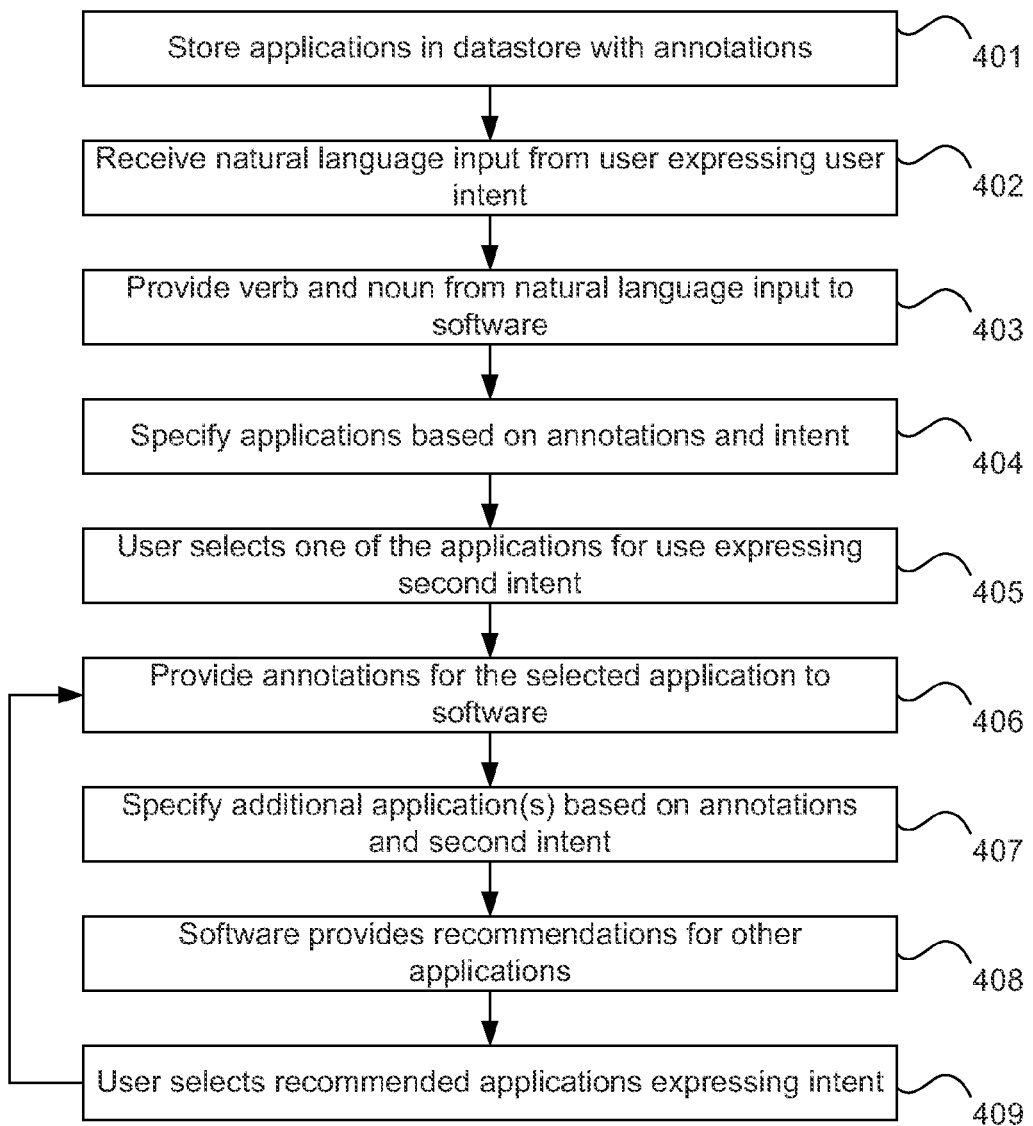

FIGS. 3-4 shows an example of accessing applications based on user intent modeling according to one embodiment. In one embodiment, the system generates a recommendation based on the verb and noun annotations for the applications and the verb and noun corresponding to the user intent. Referring to FIG. 3, application datastore 103 may include many applications with associated annotations, and the intent of a user expressed through verb/noun pairs may be used with the annotations to recommend other applications to a user, for example. Referring to FIG. 4, at 401, applications such as application 104 are stored in datastore 103 with annotations such as annotation 105. At 402, a natural language input may be received from a user expressing the user's intent (e.g., "Book Trip"). At 403, a verb and noun from the natural language input are provided to software 102 (e.g., to a direct or semantic matching algorithm in software 102). At 404, applications in datastore 103 may be specified based on annotations and the expressed intent. The applications may be specified by being presented to a user in the form of a list, for example. A user may select one of the applications for use, at 405. The verb and noun annotations (and context, if any) associated with the selected express a user's second intent. Referring again to FIG. 3, if a user selects application 104, the application may begin executing as illustrated at 350. At 406 in FIG. 4, annotations 105 for the selected application are provided to software 102. At 407, additional applications in datastore 103 are specified based on the second intent expressed through annotations 105. At 408, software 102 may provide recommendations to the user for other applications based on the second intent and annotations for such other applications. At 409, the user selects a recommended application and expresses yet another intent corresponding to the recommended applications annotations. Referring again to FIG. 3, the recommended application may be application 301 having annotations 302, which is executed as illustrated at 355. The process may continue by repeating steps 406-409, for example.

Figure 5:
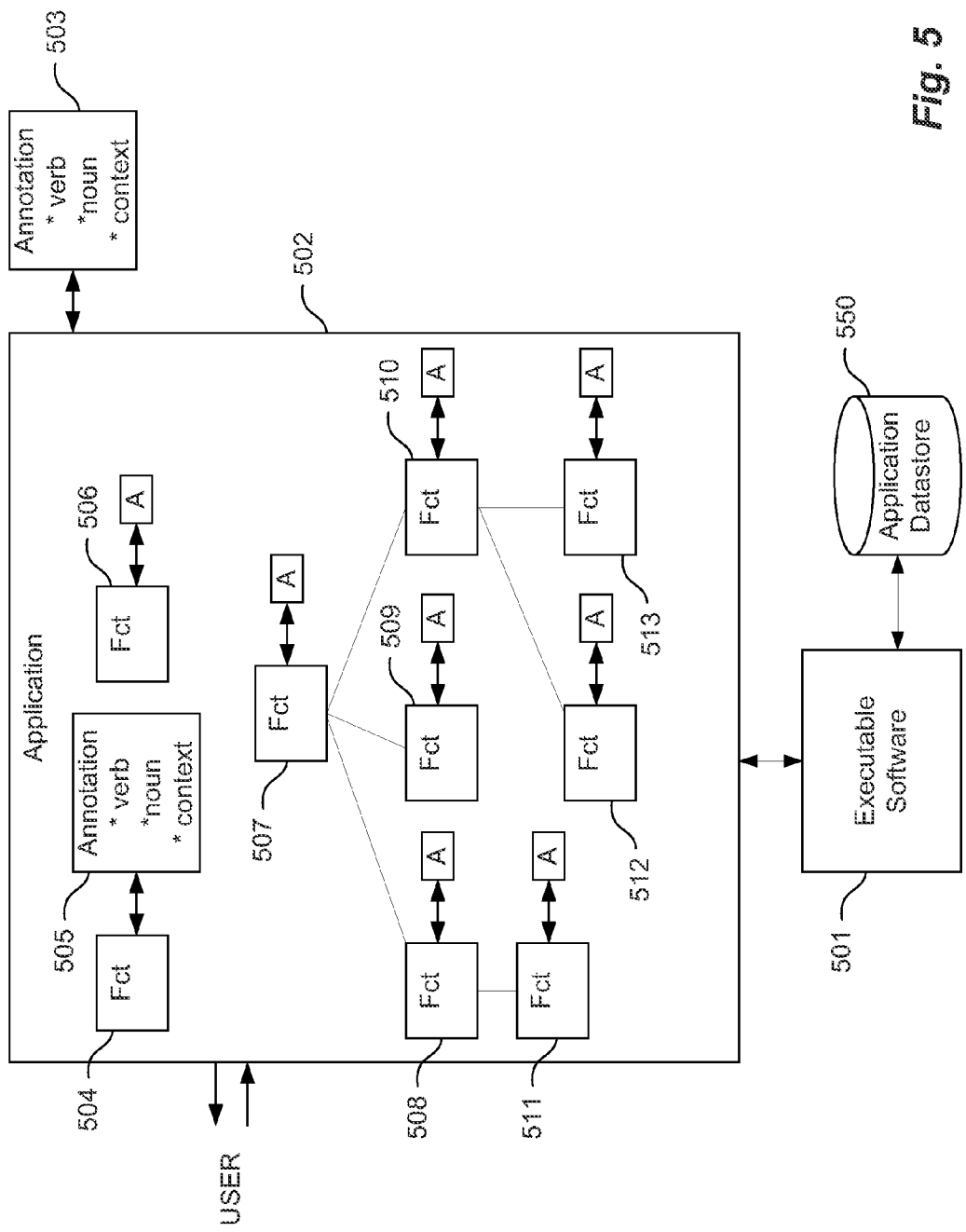
FIG. 5 shows an example application with annotated functions according to one embodiment.

FIG. 5 shows an example application with annotated functions according to one embodiment. Certain embodiments of the present invention may model user intent across multiple levels of user interaction with applications by associating annotations with different functions within an application. In this example, application 502 has annotations 503 including a verb/noun/context set. Application 502 has a plurality of functions 504 and 506-513. The functions may be user accessible functions, for example, such as buttons, menus, or any of a variety of functional features of application 502 that a user may access and use to perform tasks. Functions 504 and 506-513 have annotations, which may include a verb, noun, and optional context information. User input is received in application 502. The input from the user invokes one of the functions. Invoking a function expresses an intent of the user through the verb/noun annotations. The annotations for the associated function are used to specify one or more applications, for example, in data store 550 based on the verb and noun annotations associated with applications in the datastore 550 and the verb and noun annotations associated with the invoked function. As illustrated in FIG. 5, the annotations may be linked to stand alone functions in an application or to hierarchically nested functions in an application. The functions may be highly granular or complex processes. Function 507 is a root function with sub-functions 508, 509, and 510, for example. Function 509 is a terminal node function, whereas functions 508 has sub-function 511 and function 510 has sub-functions 512 and 513. Example functions include process execution buttons, menus, tabs, links sub-pages of an application's features, and particular settings, for example, to name just a few. An application may include an output stream of annotations as the application monitors a user's activities and provides annotations corresponding to activities to executable software 501, which in turn accesses application datastore 550 to specify applications using the annotations received from the application and annotations associated with applications in the datastore. Application 502 may include a window, for example, for recommending other applications from datastore 550 to perform particular functions based on the user's expressed intent.

Figure 6:
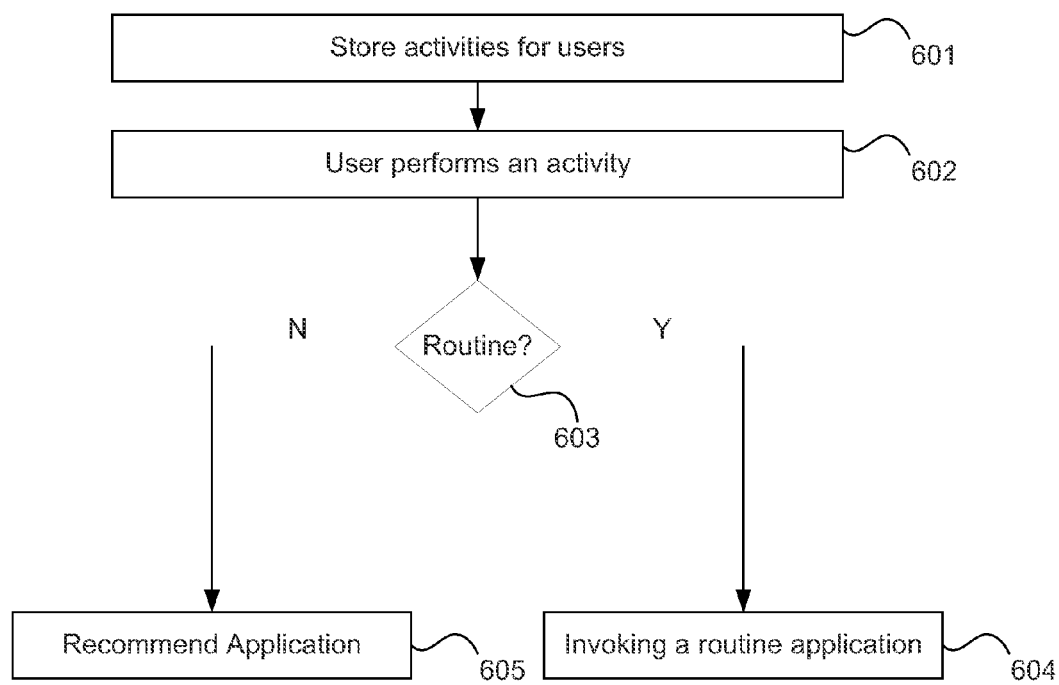
FIG. 6 shows an example process according to one embodiment.

FIG. 6 shows an example process according to one embodiment. Embodiments of the present invention may include distinguishing between routine activities and non-routine activities and performing actions according to whether or not an activity is routine. For example, at 601 activities for one or more users are stored (e.g., in a database or the datastore described above). At 602, the user performs an activity. At 603, the system determines whether or not an activity is routine or non-routine. If the activity is routine, a routine application corresponding to the activity is invoked at 604. If the activity is not routine, a non-routine application corresponding to said activity recommended at 605. For example, stored activity data may include a history of the applications invoked by the user and/or annotations associated with such applications. If user opens the same three applications every time the user logs into a system, the system may record and store such information. The system may use such data to determine that the three applications are routine, and the system may automatically launch such applications as soon as the user logs in. Alternatively, the system may store data of applications and configuration information used every time a user expresses an intent to "Book Trip." Accordingly, if a user expresses such an intent, the system may automatically invoke particular applications and configure the applications according to the user's routine preferences (e.g., using context information). The determination that an activity is routine or non-routine may be made through a variety of techniques including statistical techniques, for example. If a user expresses an intent to perform an activity that is not routine for that user, then the system may use the verb/noun expression of intent to recommend applications for performing the activity.

EXAMPLES-VERB/NOUN

Verb/Noun

A verb is a label that expresses the intent of the user when combined with a noun ("what" the outcome is that they desire) based on some business goal (the "why"). When a user "launches" a verb, in combination with a Noun (and some Context), the appropriate tool(s) (e.g., application(s)) that perform actions on behalf of the user (the "how"), will be discovered and presented to the user.

The act of uttering (or "speaking") a verb to the system may take multiple forms: in the simplest manifestation the user clicks a button in the UI or selects a menu command that represents that verb. Other mechanisms for "speaking" verbs could include a command-line interface, speech recognition, gestures etc. . . .

The verb/noun pair is a bridge to the tools—it is the tools that perform the useful actions on behalf of the user. In effect, the verb allows the system to (semi) automatically find the relevant tool, then, based on user context and the supplied (optional) noun, to instantiate the tool, populate it with the correct content, and visualize the tool in the way most meaningful to the user (possibly based on best-practice templates). For example, for "analyze sales", the system will search the tools repository (e.g., a datastore that may have been indexed by the Verb taxonomy), find an appropriate tool (such as explorer), then based on the combination of noun object ("sales") and context (the information worker is the sales manager for NW Region, she is currently planning sales for Q4) the system will retrieve the last 3 quarters of historical sales as well as the budget plan for the year, and then render a result in an appropriate visualization that allows the information worker to easily compare historical sales against planned sales.

Users may sometimes use expressions like "launch tool", or "execute tool". As stated above, it is really the tool that is ultimately launched or executed. The verb is the mechanism to get to the tool. However, it is often useful shorthand to talk about the verb as if it is actually the thing that does the useful work. We do not want to preclude this practice—and in fact for information workers it may be useful to blur this verb/tool distinction. However, from a technical artifact point of view we should bear in mind that there is a separation between the verb and the tool.

In effect, Verbs are an organizing metaphor that guides an information worker through the system, and supports them towards achieving their business goals, by allowing the system to make some "educated" guesses based on the system's understanding of both the information worker and the intent they express through verbs and goals. Information workers think in sentences, using verbs to determine the objective/goal of their thoughts and resulting actions. In a business context this can be considered as the 'lingua franca of business'—or just the 'language of business'. A system according to one embodiment of the present invention may be designed to go along the 'language of business' and strives for a better and more intuitive UI. The Verbs that are exposed by the system may, as closely as possible, resemble the mental model that the information worker has of the actions and activities that are relevant in their business domain.

Verbs are associated to tools in order to be useful. A verb may have multiple tools associated with it (and vice versa). In addition, object nouns can further be associated to tools, thus allowing further narrowing the search space for appropriate tools. For example, the "explore" verb is associated to the Explorer tool. However, the Social Network Analyzer is additionally associated to noun objects of type "community" or "groups of people". So if the user says "explore my network"—the system may infer that SNA is a better tool to use than Explorer. The information worker's context can further help narrow the possible tools to use and can be additionally used to configure the tools based on information worker preferences and associated best practices.

In one embodiment, a Language of Business may drive a proposal software engine. Where there are multiple possible candidate tools the system may ask for additional feedback from the user to select the correct tool.

The Verb taxonomy may evolve over time with minimal to no system disruption. This means adding and deleting verbs and modifying the modeled relationships between verbs. Also, as new tools are provisioned they will may be associated (with the correct semantics) to the appropriate verbs.

Intent and Goal

Expressions of user intent are related to and enable the achievement of goals; although the goal may be implicit. For example "analyze sales"—where analyze is the verb, and sales is the noun object—may be related to the business goal of "plan demand for Q4".

Elements Store

As mentioned above, the present invention includes an online store (datastore) that allows the information worker select, evaluate and deploy tools created locally and by 3rd parties by expressing intent (e.g., using a verb/noun pair). In one embodiment, by default only the core tools (apps) will be available "out of the box". For richer capabilities information workers will need to find relevant tools in the store, purchase them, and deploy them into their relevant user execution space. The Verb store supports extensibility to the software platform by incentivizing 3rd parties to provide tools.

Figure 7:
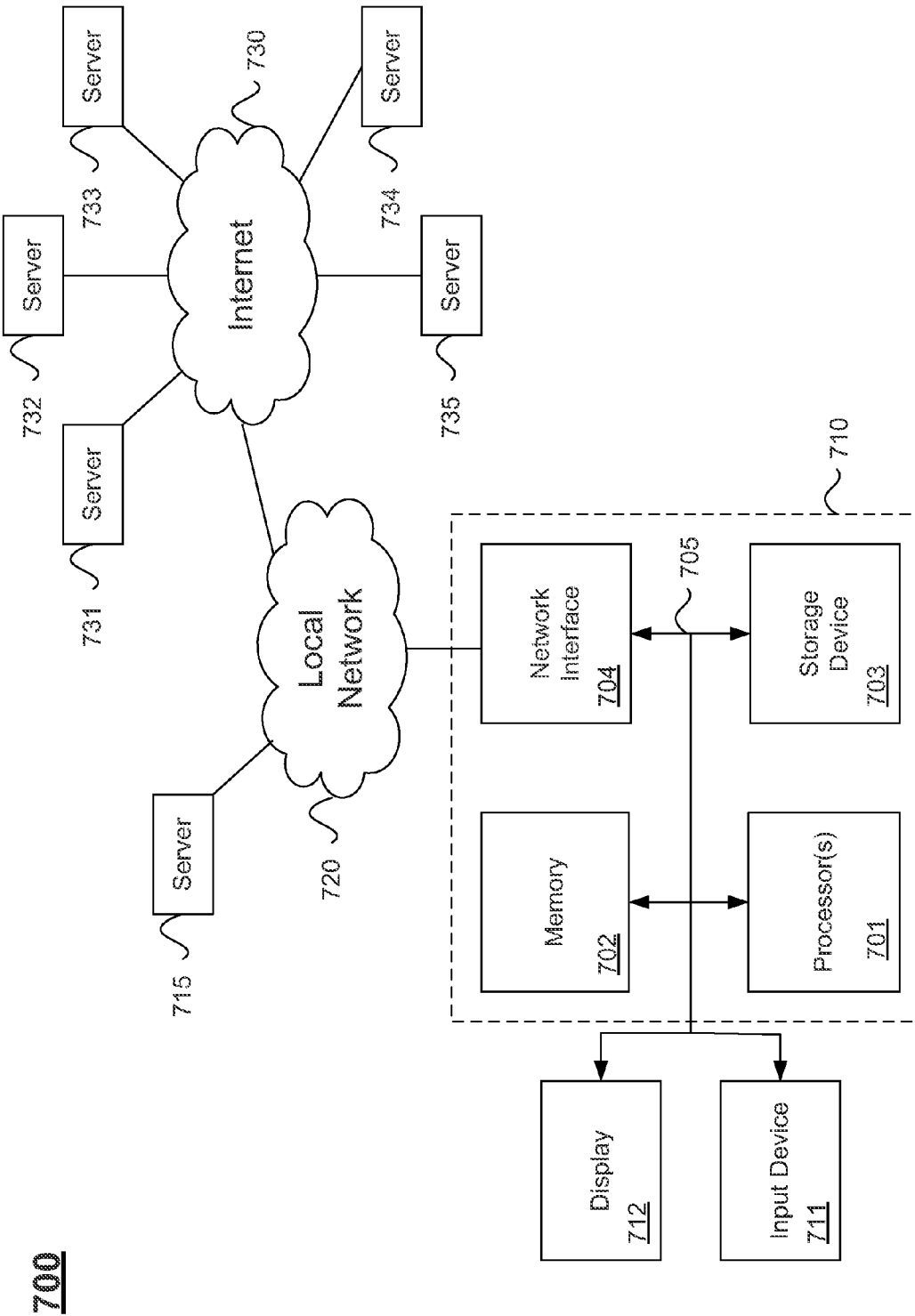
FIG. 7 illustrates hardware of a special purpose computing machine configured with a dynamic provisioning process according to one embodiment of the present invention.

FIG. 7 illustrates hardware of a special purpose computing machine configured with a dynamic provisioning process according to one embodiment of the present invention. As mentioned above, the software servers together may form a cluster, or logical network of computer systems programmed with software programs that communicate with each other and work together to process requests. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
storing information in a datastore, the information corresponding to a plurality of computer applications, wherein the plurality of computer applications have associated annotations, the annotations comprising a verb describing one or more activities performed by an associated application and a noun describing work objects on which the activities are performed, and wherein users access the applications in the datastore;
receiving an input from a user;
providing a first verb and a first noun corresponding to a user intent based on said input; and
specifying one or more of said plurality of applications based on the verb and noun annotations for the plurality of applications and the first verb and first noun corresponding to the user intent.

2. The method of claim 1 wherein said specifying is based on directly matching the first verb and first noun with the verb and noun annotations for the one or more specified applications.

3. The method of claim 1 wherein said specifying is based on semantically matching the first verb and first noun with the verb and noun annotations for the one or more specified applications.

4. The method of claim 1 wherein the verb and noun annotations are included in a semantic space.

5. The method of claim 4 wherein the verb and noun annotations are machine executable semantic representations in the semantic space.

6. The method of claim 1 wherein the annotations associated with the plurality of applications further include context information, said providing step including providing first context information corresponding to the user intent based on said input, and wherein the specifying step is further based on context information annotations and said first context information.

7. The method of claim 1 wherein the user input specifies the first verb and first noun directly.

8. The method of claim 1 wherein the user input selects a first application and the first verb and first noun are annotations associated with the first application.

9. The method of claim 1 further comprising a prestored language comprising verbs and nouns, wherein the verb and noun annotations and the first verb and first noun are in said language.

10. The method of claim 1 further comprising generating a recommendation based on the verb and noun annotations for the plurality of applications and the first verb and first noun corresponding to the user intent.

11. The method of claim 1 further comprising:
monitoring annotations from a plurality of applications accessed by the user; and
generating recommendations based on the monitored annotations.

12. The method of claim 1 wherein the input from the user is received in a first application, the first application having a plurality of functions having associated verb and noun annotations, and wherein the input from the user invokes one or more of said functions and the method further comprises specifying one or more of said plurality of applications based on the verb and noun annotations for the plurality of applications and the verb and noun annotations associated with said invoked function.

13. The method of claim 12 wherein the functions are user accessible.

14. The method of claim 12 wherein the functions are hierarchical within the first application.

15. The method of claim 1 further comprising:
storing activities for a user; and determining whether or not an activity is routine or non-routine, wherein if an activity is routine, the method further comprises automatically invoking a routine application corresponding to said activity, and if the activity is not routine, the method further comprises recommending a non-routine application corresponding to said activity.

16. A non-transitory computer readable storage medium embodying a computer program for performing a method, said method comprising:

storing information in a datastore, the information corresponding to a plurality of computer applications, wherein the plurality of computer applications have associated annotations, the annotations comprising a verb describing one or more activities performed by an associated application and a noun describing work objects on which the activities are performed;

receiving an input from a user;

providing a first verb and a first noun corresponding to a user intent based on said input; and specifying one or more of said plurality of applications based on the verb and noun annotations for the plurality of applications and the first verb and first noun corresponding to the user intent.

17. The non-transitory computer readable storage medium of claim 16 wherein said specifying is based on directly matching the first verb and first noun with the verb and noun annotations for the one or more specified applications.

18. The non-transitory computer readable storage medium of claim 16 wherein said specifying is based on semantically matching the first verb and first noun with the verb and noun annotations for the one or more specified applications.

19. A computer system comprising:

one or more processors;

a software program, executable on said computer system, the software program configured to:

store information in a datastore, the information corresponding to a plurality of computer applications, wherein the plurality of computer applications have associated annotations, the annotations comprising a verb describing one or more activities performed by an associated application and a noun describing work objects on which the activities are performed;

receive an input from a user;

provide a first verb and a first noun corresponding to a user intent based on said input; and specify one or more of said plurality of applications based on the verb and noun annotations for the plurality of applications and the first verb and first noun corresponding to the user intent.

20. The system of claim 19 wherein said specifying is based on semantically matching the first verb and first noun with the verb and noun annotations for the one or more specified applications.

* * * * *